(12) United States Patent
Baldwin (10) Patent No.: US 9,560,269 B2
(45) Date of Patent: Jan. 31, 2017

(54) COLLABORATIVE IMAGE CAPTURING (71) Applicant: Amazon Technologies, Inc., Reno, NV (US)

(72) Inventor: Leo Benedict Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 15/019,960

(22) Filed: Feb. 9, 2016

(65) Prior Publication Data

US 2016/0156842 A1   Jun. 2, 2016

Related U.S. Application Data

(63) Continuation of application No. 13/711,852, filed on Dec. 12, 2012, now Pat. No. 9,264,598.

(51) Int. Cl.
*H04N 5/92* (2006.01)
*H04N 5/232* (2006.01)
*H04N 5/235* (2006.01)
*H04N 5/247* (2006.01)
*H04N 13/00* (2006.01)
*H04N 13/02* (2006.01)

(52) U.S. Cl.
CPC ........ *H04N 5/23222* (2013.01); *H04N 5/2354* (2013.01); *H04N 5/23203* (2013.01); *H04N 5/23206* (2013.01); *H04N 5/23238* (2013.01); *H04N 5/247* (2013.01); *H04N 13/0007* (2013.01); *H04N 13/0051* (2013.01); *H04N 13/0239* (2013.01); *H04N 13/0242* (2013.01); *H04N 13/0296* (2013.01)

(58) Field of Classification Search
None
See application file for complete search history.

(56) References Cited

U.S. PATENT DOCUMENTS

| 2009/0052760 | A1* | 2/2009 | Smith .................. A61N 5/1049 382/132 |
| 2010/0188494 | A1* | 7/2010 | Mukai ...................... H04N 7/18 348/77 |
| 2011/0109717 | A1 | 5/2011 | Nimon et al. |
| 2011/0109726 | A1* | 5/2011 | Hwang .............. H04N 13/0242 348/47 |

(Continued)

OTHER PUBLICATIONS

Brown, Matthew, et al., "Recognising Panoramas." Proceedings of the Ninth IEEE International Conference on Computer Vision, 8 pages, 2003.

*Primary Examiner* — Eileen Adams
(74) *Attorney, Agent, or Firm* — Polsinelli LLP (57) ABSTRACT

Systems and approaches are provided to allow for collaborative image capturing. Multiple user devices subscribed to the collaborative image capturing system can be synchronized to perform certain image capturing related tasks, including coordinated image capture. When the user devices are widely dispersed, the image data can be aggregated to generate composited image data, such as panoramas, 3-D transformations, or stereoscopic image data. Multiple user devices can also be coordinated to simultaneously flash or activate other light emitting components that may improve lighting condition than would otherwise be capable of a single computing device.

20 Claims, 6 Drawing Sheets

(56) References Cited

U.S. PATENT DOCUMENTS

| | | | |
|---|---|---|---|
| 2011/0216208 A1* | 9/2011 | Matsuzawa | H04N 5/23203 348/211.2 |
| 2012/0044001 A1* | 2/2012 | Tanaka | H03L 7/235 327/156 |
| 2012/0188344 A1 | 7/2012 | Imai | |
| 2013/0235233 A1 | 9/2013 | Ellis et al. | |
| 2013/0322862 A1* | 12/2013 | Hsu | G02B 7/285 396/125 |

* cited by examiner

- Front -   - Back -

COLLABORATIVE IMAGE CAPTURING

CROSS-REFERENCE TO RELATED APPLICATIONS

This application is a continuation of U.S. patent application Ser. No. 13/711,852, filed on Dec. 12, 2012, the content of which is incorporated herein by reference.

BACKGROUND

As personal electronic devices become increasingly sophisticated, people are using such devices in new and interesting ways. For example, users can employ their portable computing devices to share personal experiences or interact with others. In particular, users may operate a camera of an electronic device to capture photographs or videos to share with friends and family. Users can also upload photos or videos to social networking sites or photo/video sharing services to enable others to access the user photos and videos. In some situations, users can also associate metadata, such as hash tags or captions, with their photos and videos so that others who may also share an interest in the subject matter of the photos and videos can easily locate the photos and videos. Some users, however, may wish to experience an even deeper level of collaboration and cooperation than is currently possible with conventional computing devices and methods.

BRIEF DESCRIPTION OF THE DRAWINGS

Various embodiments in accordance with the present disclosure will be described with reference to the drawings, in which.

DETAILED DESCRIPTION

Image capturing may be one of the more salient features of an electronic device, but conventional devices and approaches can sometimes leave something to be desired. For instance, users may want to obtain images and videos representing a wider field of view, e.g., a panoramic image or video, as such content can deliver a more engaging experience for viewers but the users' devices may only be equipped with conventional image capturing components. In some cases, users may be confined to a specific location and may not be able to acquire an image at a preferred perspective because that angle is not available at the user's location, or certain subject matter may be blocked or occluded from the user's location. In other situations, a shutter speed of the imaging component may be too slow and video may not be capable of recording image data at a sufficient display resolution such that the user can miss an opportunity to take an ideal shot if an image is captured an instant too late. Systems and methods in accordance with various embodiments of the present disclosure may overcome one or more of the aforementioned and other deficiencies experienced in conventional approaches to capturing image data.

In various embodiments, multiple users of electronic devices can elect to participate in or subscribe to a collaborative image capturing system. In some embodiments, these electronic devices may include one or more image capturing components and one or more network or inter-device communication components. When these multiple users or subscribers are part of the collaborative image capturing system and the multiple users are proximate to one another, the image capturing components of their electronic devices may be synchronized to acquire image data of a common subject matter at substantially the same time. For example, in certain embodiments, multiple subscribers may press a shutter button of the image capturing component at various times but the release of the respective shutters of user devices may be delayed. The collaborative image capturing system may include one or more centralized computing devices, and the centralized computing device(s) can determine a coordinated time at which the image capturing devices can release their respective shutters to capture an image. In one embodiment, the centralized computing device(s) can send a message or signal to each participating user or subscriber device with a delay time based on the coordinated time. The message or signal can be sent in response to a subscriber pressing on the shutter button of her image capturing component. In another embodiment, the centralized computing device(s) can broadcast a message or signal to each image capturing component to immediately capture the image at the coordinated time. In these ways, multiple images of a common subject matter may be captured at substantially the same time.

In some embodiments, the images captured at the coordinated time can be uploaded to a logically centralized image data store (or stores). In some situations, the images can be automatically and immediately uploaded such as when the network connection of a user's device has sufficient bandwidth. In other cases, the images can be uploaded at a later time and/or uploaded at the user's discretion. The centralized image data store(s) may be associated with a user interface, such as a website or an application, to allow the users to view the aggregated image data and perform other tasks regarding the image data. In certain embodiments, multiple images can be stitched together to create a composite image and/or video, such as a panorama or a 3-D model of the subject matter of the images.

In still other embodiments, a collaborative image capturing system can coordinate performance of certain tasks by participants and/or their devices. For instance, in various embodiments, multiple devices may be configured to flash or at least have a light emitting component activated at substantially the same time as the coordinated time of image capture. In one embodiment, a quorum of the subscribing devices may detect insufficient light at a common location and the centralized computing device(s) can send a message or command to all participating devices to flash a light emitting diode (LED) or trigger another light emitting component at substantially the same time as image capture. This message or command may generate a widely dispersed, powerful burst of light depending on the number of participants in the collaborative system.

Various other functions and advantages are described and suggested below in accordance with the various embodiments.

Figure 1:
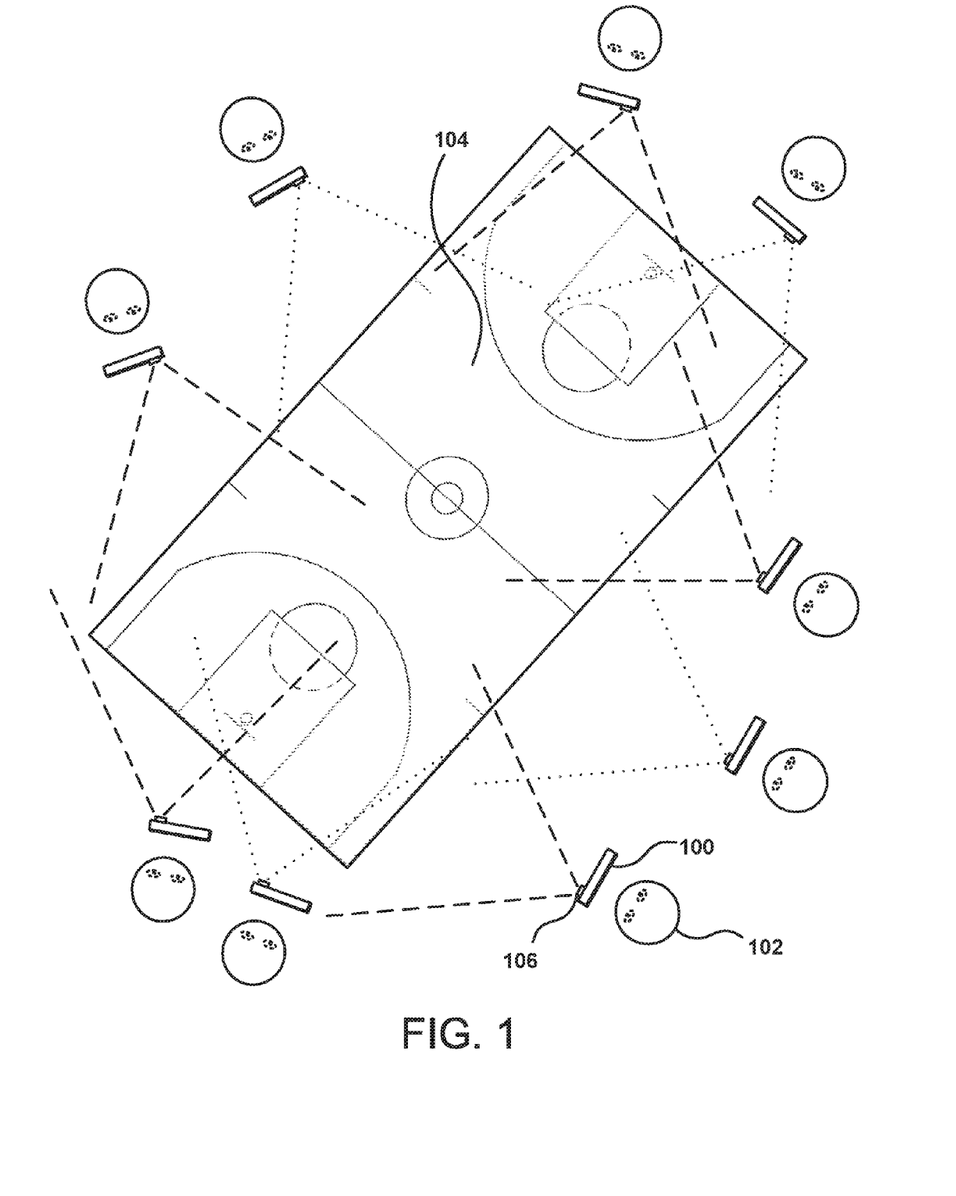
FIG. 1 illustrates an example of collaborative image capturing in accordance with an embodiment.

FIG. 1 illustrates an example of multiple users or subscribers 102 participating in a collaborative image capturing system in accordance with an embodiment. Each user 102 is utilizing a computing device 100 that may include at least one image capturing component 106. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, cellular phones, video gaming consoles or controllers, and portable media players, among others. In this example, each of the subscribers 102 is attending a basketball game and capturing a particular perspective of the basketball court 104 at her respective location. Each user 102 is shown to be dispersed in bleachers or seating surrounding the basketball court 104 to capture an image or video of the action on the court 104 at multiple different angles.

In one embodiment, the subscribers may have previously signed up to participate in a collaborative image capturing system, and the subscribers' devices can therefore be configured to automatically capture images in accordance with the system when they are in proximity with other participants. In another embodiment, each user may be notified that she is within proximity of other users of the collaborative image capturing system and can be invited to participate in cooperative image capturing according to the system. In yet another embodiment, the user 102 may create a collaborative image capturing event at a current location. The user can designate the event public or private. When the event is designated private, the user can invite other users to participate in the event by sending out an invitation with a password or other kind of secured invitation. Invitations may be broadcast according to a user's lists of contacts. Invitations can also be broadcast to other users in proximity of the current location and having certain reputation scores or other user data deeming them suitable to participate in the collaborative image capturing event. When the event is designated public, any user can scan the current location for active collaborative image capturing events and subscribe to a particular event. In one embodiment, centralized computing device(s) may consolidate multiple public events at a specific location into a single event.

In some embodiments, inter-device communication, such as between a user and the centralized computing device(s) and/or other user devices of a collaborative image capturing system, can be achieved by each computing device 100 of the system being equipped with one or more components operable to communicate with other computing devices along a communication channel, such as a cellular channel, Wi-Fi channel, Bluetooth® channel, or other conventional communication channel. In one embodiment, the centralized computing device(s) may comprise one or more computer systems located at a remote location. Alternatively, or in addition, a centralized computing device may comprise a user device 100 that has created a collaborative image capturing event. In another embodiment, remote computing systems may initially be designated the centralized computing devices of a collaborate image capturing system but other computing devices, such as a user device 100, may subsequently be designated the centralized computing device, such as when the participants' computing devices lose network connection to the originally designated centralized computing device(s). For example, in one embodiment, one or more application servers and/or web servers located remotely with respect to a particular location may have originally been designated the centralized computing device(s) for a collaborative image capturing event including multiple participating users. Network communication with the one or more application and/or web servers, such as along a cellular or Wi-Fi channel, may be interrupted. A user device 100, such as the device of the user creating the collaborative image capturing event, may then be designated the centralized computing device for the event and can communicate with other participating devices along a different communication channel, such as a Bluetooth® channel.

In a collaborative image capturing system in accordance with various embodiments, a user 102 of a computing device 100 may attempt to capture an image by depressing a shutter button of a capturing component 106 on the device 100. In some embodiments, the release of the shutter of the capturing component 106 may be delayed for up to a maximum period of time, such as between three seconds to thirty seconds. The length of time may be specified by the centralized computing device(s) of the collaborative system or may be specified by a user creating a collaborative image capturing event. Pressing the shutter button on the image capturing component 106 can also trigger a signal or a message that is sent to centralized computing device(s) of the collaborative system, which as discussed above, may be computing systems located remotely from the user 100 or can be another user device within the vicinity of the user 100. When the signal or message is received by the centralized computing device(s), the centralized device(s) may determine a coordinated time in which all participating user devices will simultaneously release their shutters to capture an image at substantially the same time. Preferably, the coordinated time will be in accordance with a universal time format, such as the Coordinated Universal Time (UTC), defined by the International Telecommunications Union Recommendation (ITU-R TF.460-6). In one embodiment, the centralized device(s) may immediately send a response to the user device 100 to indicate the time to release the shutter on the image capturing component 106 in UTC format. Alternatively, the centralized device(s) may send a delay period, such as in milliseconds, to the user device 100 in which to delay shutter release. However, providing a shutter release time in UTC format may be more advantageous in the event of network latency and other such delays. In another embodiment, shutter release of participating devices, such as user device 100, may be gated to a signal from centralized computing device(s) of the collaborative computing system. At the coordinated time, the centralized computing device(s) may propagate a signal to each of the participating devices to release the shutters on the image capturing components to synchronize image capture at substantially the same time.

In one embodiment, one or more user devices 100 may implement zero shutter lag (ZSL). ZSL can refer to the operation of an image capturing component, such as image capturing component 106, in full-frame video mode, such that when the shutter button is pressed, the image corresponding to the shutter button press can either comprise the current frame if more than half of the current frame has already been acquired or the last frame in memory if less than half of the current frame has been captured. In this way, image capture may not be delayed (or advanced) by more than half of the frame rate of the image capturing component. Operating an image capturing component with ZSL in accordance with various embodiments may enable participating user devices to capture images more precisely at the coordinated time. In one embodiment, when a user device is configured to operate with ZSL, the user may not necessarily have to press the shutter button to capture an image. Instead, the device will automatically release the shutter of the image capturing component of such a device at a coordinated time to capture an image. In this example, the user may be able to configure their device to implement such a feature or to disable such a feature. In another embodiment employing ZSL, a shutter button press can result in a particular image being tagged as a user image (i.e., an image not intended to be contributed to the collaborative image capturing event) and the same or a separate image or images can be tagged as part of the collaborative effort. The decision to fire the flash is made locally to the device for the user image, and the decision to fire the flash on the collaborative image can be made locally to the device or can be determined by the centralized computing device coordinating the collaborative effort. For example, in large venues with low lighting, the decision to fire the flash for a collaborative image capturing event may be made locally as the likelihood of too much flash is low whereas in more intimate collaborative events the coordinating device may command an absolute flash value taking into account the total number of flashes or it may command a lower value by a factor of the locally determined value. In some cases, collaborative flash may be reduced per device out of consideration for the subject.

In certain embodiments that implement ZSL, a generator locking or genlock signal can be used among coordinating devices to further synchronize collaborative image capturing or collaborative flashing. In one embodiment, the genlock signal can be generated by a centralized computing device, received by each device participating in the collaborative image capturing event, and used by each participating device to sync image capture, such as on a rising edge or falling edge of the genlock signal. In another embodiment, a separate system can be relied upon for the genlock signal such that the separate system acts as a common reference point for participating devices. Each of the participating devices can synchronize with one another according to the genlock signal of the separate system.

Figure 2:
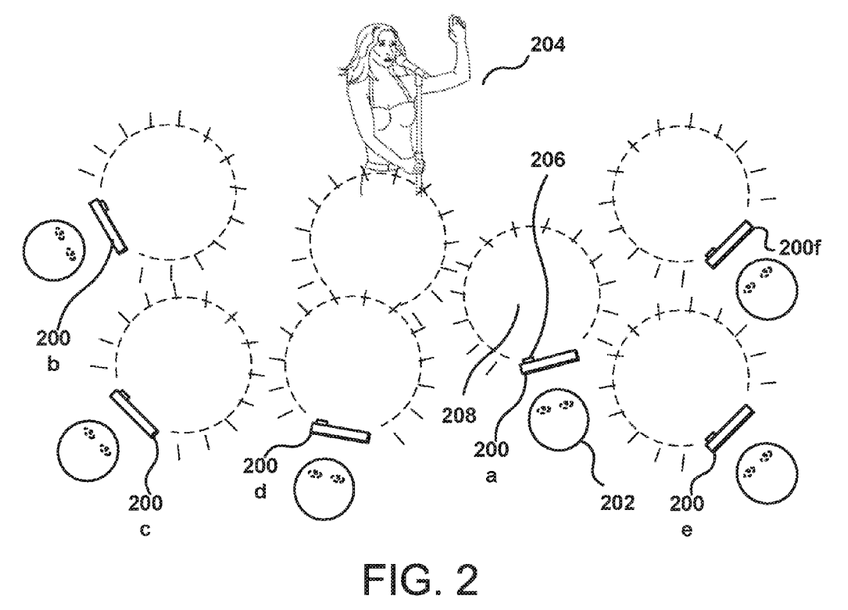
FIG. 2 illustrates an example of a system performing a collaborative task related to image capturing in accordance with an embodiment.

FIG. 2 illustrates an example of a system performing a collaborative task related to image capturing according to an embodiment. In this example, multiple users, such as user 202, are participating in a collaborative image capturing event at an intimate concert or show with a live singer 204. Each user 202 is operating a computing device, such as device 200a, including an image capturing component 206. Although not shown, each computing device 200 also includes a light emitting component, such as a flash LED. In this example, the venue for this particular event is dimly lit when each of the multiple users 202 desire to obtain images or videos of the singer 204. When the multiple users press a shutter button (or enable automatic image capturing as discussed above), the centralized computing device(s) of the collaborative image capturing system can coordinate image capture by each of the multiple users at substantially the same time. As the venue here is not well lit, the centralized computing device(s) of the collaborative system may determine to synchronize flashing of LEDs and/or other light emitting components of the user devices during the coordinated time of image capture. At the designated time of image capture, the LEDs of each of the multiple user devices are triggered, such as depicted by the flash 208.

In various embodiments, the collaborative image capturing system can coordinate lighting conditions to minimize disruption to the subject matter of image capture, such as the singer 204. In one embodiment, each of the flashing/lighting components can be configured to emit light at less than full power to diffuse the aggregated effect of multiple flashes or other bursts of light from multiple participating devices. In another embodiment, the collaborative system may coordinate lighting so that only some of the user devices, such as devices 200b, 200d, 200a, and 200f, may flash to provide sufficient illumination to capture the singer 204, while redundant light sources of other devices, such as devices 200c and 200f, may not flash to diffuse the collective lighting of all participating user devices. The centralized computing device(s) may obtain from participating devices orientation and/or position data from motion/orientation determining components of the participating devices, such as gyroscopes, accelerometers, and/or digital compasses, to enhance this feature. Alternatively, or in addition, the centralized computing device(s) can determine how to disperse lighting from the image data obtained by the participating devices.

Figure 3:
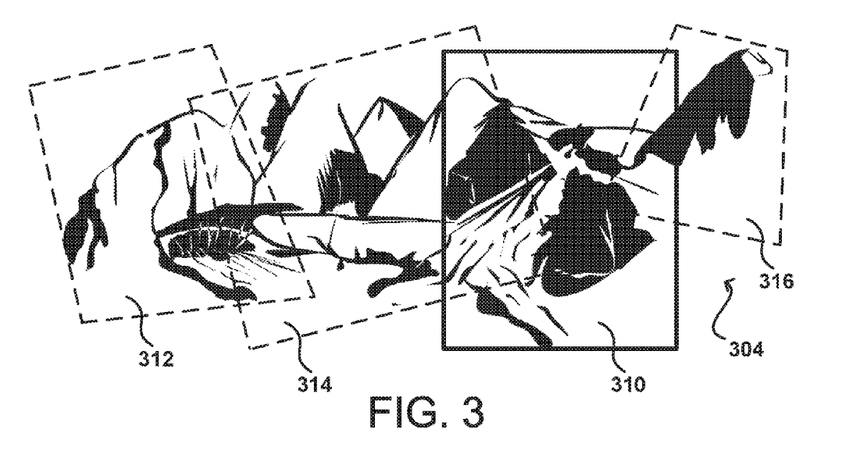
FIG. 3 illustrates an example of collaborative image capturing in accordance with an embodiment.

FIG. 3 illustrates an example of collaborative image capturing according to an embodiment. When images or videos are obtained by devices participating in a collaborative image capturing system in accordance with various embodiments, they may be uploaded to one or more centralized data stores. The images or videos may be automatically uploaded after capture if the user device is connected to a network link that provides sufficient bandwidth. Alternatively, the images or videos may be uploaded at a later time and/or at the user's discretion. Subscribers of the collaborative image capturing system may configure their devices according to these various approaches. In one embodiment, lower resolution images or videos may be uploaded to the centralized data store(s) to provide a preview of a composited image or video, and the full resolution images or videos can be uploaded later. When images or videos are uploaded to the centralized data store(s), metadata associated with the respective images or videos can also be collected. The metadata for each image or video may include user data associated with a computing device; geolocation data such as obtained by a global positioning system (GPS) component of the computing device; orientation and/or position data such as obtained by a gyroscope, accelerometer, digital compass, or other inertial sensing components of the computing device; one or more timestamps; hash tags or other descriptive information associated with the image data; data about an image capturing component used to obtain the image data such as focal length, display resolution, shutter speed, etc.; and image data such as the dimensions of the image, the size of the data, data format, etc.

In the example of FIG. 3, a group of hikers may have previously subscribed to a collaborative image capturing event in accordance with an embodiment. At a particular point in time, the hikers may decide to capture an image or video of common subject matter such as a scenic vista 304. In this situation, communication channels such as cellular or Wi-Fi may not be available to the computing devices of the hikers. Therefore, one computing device of the group of hikers may be designated the centralized computing device of the collaborative image capturing system. The user device designated as the centralized computing device may coordinate image capture by using another inter-device communication channel such as a Bluetooth® channel or other radio frequency (RF) channel. Image or video capture can be coordinated, and the image data and associated metadata can be stored on memory components of the user devices. When the hikers subsequently travel to a location with network connectivity, the stored image data and metadata may be uploaded to centralized data store(s) as discussed above. When enough image data of the collaborative image capturing event has been uploaded, the collaborative image capturing system can process the image data and metadata to perform various tasks.

In this example, the collaborative image capturing system may determine that the captured image data can be composited into a panoramic image or video of the vista 304. In one embodiment, the user interface of the collaborative image capturing system may provide some kind of indication to a user of his particular contribution to the panorama, such as by highlighting the segment 310. Alternatively, or in addition, each of the segments 310, 312, 314, and 316 are selectable by any subscriber to the collaborative image capturing event and selection of a particular segment may provide the metadata, including the user information, associated with that segment. Although the example of FIG. 3 is an "offline" process, it should be understood that panoramas can also be generated "online" or in substantially real time depending on the network connectivity of subscribing devices. For example, if there is a Wi-Fi channel available to the subscribing users of a collaborative image capturing event and acquired image data is uploaded after capture, a composited image or video can be provided with little to unnoticeable delay in certain embodiments.

The process of compositing several related, potentially overlapping images (or video frames) into a single image (or video frame) can sometimes be referred to as image stitching. Image stitching can include sub-processes such as image registration, calibration, and/or blending. Image registration can be thought of as matching the features in multiple images or otherwise aligning the images that contain overlapping scenes. Image registration can also compensate for scaling or rotation differences between overlapping images. For example, scaling will account for differences in magnification between images which can originate in the camera (i.e., different focal lengths or fields of view) and differences in object distance between images even if the cameras are similar. Rotation can offset differences in orientation between images, such as when a user is holding an image capturing device at an askew angle or when the user is standing on uneven ground. Image calibration can include steps such as attempting to minimize the differences between an ideal lens model and the lens that was used to capture the image. Calibration can include steps to minimize optical defects and other imperfections in the image. Image blending may include executing the adjustments determining the calibration stage, combined with remapping of the images to an output projection.

Image registration techniques can include direct methods or feature-based methods. Direct methods can refer to pixel-to-pixel matching and may operate according to an error metric used as a threshold to compare how well two images correspond. Once the error metric has been defined, an appropriate search approach is determined to find correspondences between images. A brute force search approach can be used to determine such correspondences, but may be computationally expensive. Therefore, hierarchical coarse-to-fine techniques based on image pyramids can be used. Fourier transforms can also be used to speed up computation. Additional steps operating at the sub-pixel level such as those based on expansion of a Taylor series or parametric motion models of the image data can also be used.

Feature-based methods can refer to matching salient features between respective images and may include the steps of extracting suitable features from the respective images, matching such features to establish a global correspondence, estimating the geometric transformation between the respective images, and resampling and transforming the images. Features can be points of interests or key points within an image and may include edges (detected using, e.g., Canny edge detection), corners (detecting, using, e.g., Harris corner detection or Smallest Univalue Segment Assimilating Nucleus (SUSAN) corner detection), or regions of interest (detected, using, e.g., LaPlacian of Gaussian pyramids or Difference of Gaussian pyramids). After detecting the features, feature-based registration methods next involve feature matching techniques, such as the Scale Invariant Feature Transform (SIFT) algorithm or the Speeded up Robust Feature (SURF) algorithm. Once feature correspondences have been computed, a subset of the correspondences can be selected to estimate a transformation that will produce an accurate alignment. Methods used for transformation estimation can include RANdom Sample Consensus (RANSAC) or least median of squares (LMS) methods. In various embodiments, direct methods may be used to register captured image data. In other embodiments, feature-based methods can be used for video registration as both registration approaches are contemplated and equally within the scope of the invention.

Images may be aligned according to a compositing surface or projection model. A projection model can be thought of as the canvas upon which pixels of captured images are painted. Another way of understanding the projection model is to imagine the entire field of view for all viewing angles for a particular location at a moment in time as the surface of a sphere; then the projection model may refer to a two-dimensional surface to which the entire spherical field of view is translated for purposes of display. A projection may be one of a planar surface (or rectilinear projection), a cylinder, or a sphere (or equirectangular projection). A planar projection may be suitable for images representing lower horizontal view angles but may be less advantageous for images representing horizontal angles of view greater than 120°. For example, exceeding this horizontal viewing angle may result in skewing of objects appearing at the edges of the image. A cylindrical projection can be used to capture images up to 360° horizontally but lines parallel to the horizon may be curved. In addition, a cylindrical projection may not be suitable for images representing a very large vertical angle of view where deformations can be perceived at the top and bottom of the image exceeding 55° above or below the field of horizon. A spherical or equirectangular projection may not be limited to any horizontal or vertical viewing angle but may require a special display such as a domed or hemispherical screen and/or customized viewing application. Other types of projection models known to be used in panoramas include a Mercator projection, a fisheye projection, a sinusoidal projection, and a stereographic projection, but these projections may be less advantageous.

After defining the projection model, the registered images may be composited according to the model and the composite image may be blended to compensate for sampling and exposure differences. Sampling differences may occur in situations where images are captured by image capturing components having different resolutions. Exposure differences may be the result of auto-gain features of some image capturing components or the tendency of certain image capturing moments to diffuse light from the center of the image. Sampling and exposure differences can be compensated with various blending techniques known to those of ordinary skill in the art, including feathering and center-weighting, Laplacian pyramid blending, gradient domain blending, or high dynamic range imaging.

Although the example of FIG. 3 depicts a planar or rectilinear panorama, it will be appreciated that cylindrical panoramas, spherical or equirectangular panoramas, or other projections can also be generated in accordance with other embodiments and depending on the nature of the image data captured. In still other embodiments, other image renderings such as 3-D transformations or stereoscopic images can also be generated depending on the captured image data. The collaborative image capturing system may include various configurations, such as the configuration described in FIG. 8, to generate these image transformations and renderings. In addition to image processing services, the collaborative image capturing system can also provide a user interface via a website or an application to enable users to perform other tasks related to captured image data. For instance, the user interface may include special viewers for the different transformations and renderings provided by the image processing techniques; conventional photo or video galleries; image or video editing services; image or video compression services; social networking interfaces to share image data; search services; automatic descriptive tagging or face-tagging services; printing services; and other image and video related services.

Figure 4:
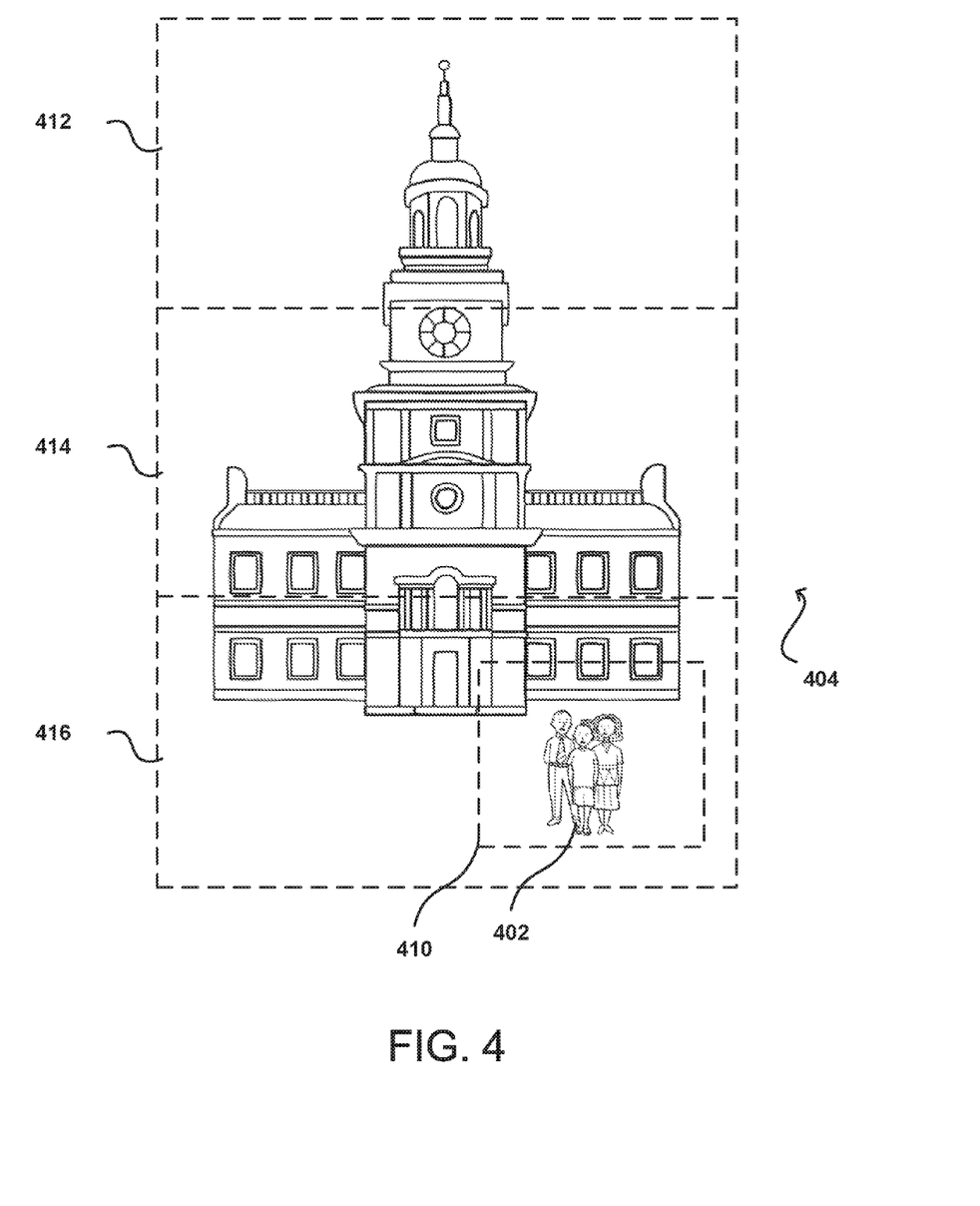
FIG. 4 illustrates an example of collaborative image capturing in accordance with an embodiment.

FIG. 4 illustrates an example of collaborative image capturing according to an embodiment. In this example, the subject matter of a composited image is a family 402 in front of a public monument 404 representing Independence Hall in Philadelphia, Pa. One segment 410 of the composited image may be taken using an image capturing component of a user device belonging to the family 402. The source of the other segments 412, 414, and 416 may vary. In one embodiment, the segments 412, 414, and 416 may be historical image data from other users stored by the collaborative image capturing system. When the subject matter of a collaborative image capturing event is a public event or at a public location, such as the public monument 404, any subscriber to the collaborative system may search for such image data and aggregate it with their own image data to create new composite image data such as depicted by FIG. 4.

In another embodiment, the segments 412, 414, and 416 may be historical image data associated with the family 402. For instance, at one moment in time, the family 402 may operate their camera(s) to pan, tilt, or zoom to capture image data of a desired scene at various display resolutions. At another moment in time, the family 402 can have a passerby take a family photo, such as segment 410, within the desired scene. All of the image data can be uploaded to a centralized server of the collaborative image capturing system. In one embodiment, the collaborative system may determine that these images can be composited based on geolocation metadata associated with the images. In another embodiment, timestamps associated with the images may be relatively close to one another such that the collaborative system will attempt to compose the images. In still other embodiments, a subscriber can select a collection of images and request the collaborative system to form one or more composite images from the collection for the user to pick from.

Figure 5:
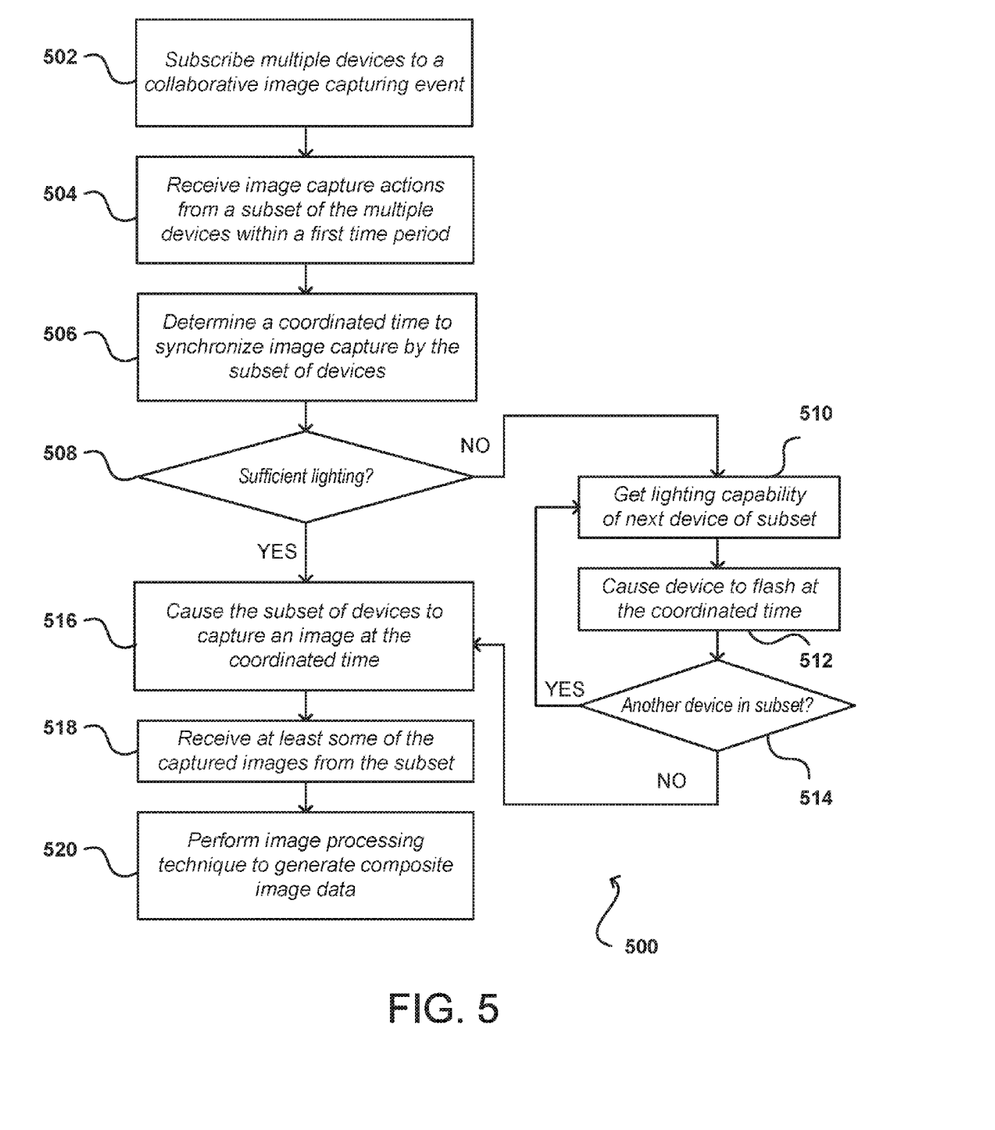
FIG. 5 illustrates an example process of collaborative image capturing in accordance with various embodiments.

FIG. 5 illustrates an example process 500 for collaborative image capturing that can be used in accordance with various embodiments. It should be understood that, for any process discussed herein, there can be additional, fewer, or alternative steps performed in similar or alternative orders, or in parallel, within the scope of the various embodiments unless otherwise stated. In this example, the process is initiated by multiple user devices requesting to be subscribed to a collaborative image capturing system or a collaborative image capturing event 502. As discussed above, in one embodiment, the event can be created by a user at a particular event and other users may be invited on an individual basis. Alternatively, or in addition, users may scan for events to join when at a location with other collaborative system participants. In another embodiment, users can be subscribed to the collaborative image capturing system whenever in the presence of other users without having to create an event or to subscribe to an event. In one embodiment, users may be automatically subscribed to the system when in active image capturing mode and in the presence of other users. In another embodiment, the collaborative image system may collect geolocation data of users actively using their cameras, and when the system determines that multiple subscribers are within proximity of each other, the system can send an invitation to the users to operate their cameras in accordance with the system.

After multiple users have subscribed to the collaborative image capturing system or a collaborative image capturing event, the system may receive requests from the subscribers 504 to capture an image. In one embodiment, each of the requests can comprise a press of a shutter button. In conventional image capturing mode, the shutter would release and an image would be captured. In various embodiments, the release of the shutter is delayed. In another embodiment, no shutter button press is required. Instead, a user may configure her computing device to automatically synchronize image capturing with other users without having to trigger the shutter release.

Subsequently, the centralized computing device(s) of the system may determine a coordinated time for image capture 506. In one embodiment, the centralized computing device(s) may comprise one or more remote computer systems depending on network availability of participating user devices. In another embodiment, the centralized computing device may be another user device. In various embodiments, the coordinated time may be determined statically, such as a period of every 10 seconds or 30 seconds. In other embodiments, the coordinated time may be determined dynamically based upon the number of users who have pressed the shutter button within a time period before a collaborative image capture moment or who have configured their devices to automatically synchronize collaborative image capture. The system can set the coordinated time once a threshold number of users have elected to collaborate on image capturing. In the instances when there is a lengthy period between collaborative image capture moments, the user devices may function under complete control of the user. Shutter control of the camera may be disabled to the user for a brief period before collaborative image capture to improve synchronization. In various embodiments, user devices may also be configured to operate with ZSL to further improve synchronization. In this case, some images can be tagged as strictly user images (i.e., not intended to be shared as part of a collaborative image) and other images can be tagged as intended for contribution to the collaborative effort. In still other situations, images captured using ZSL may not be tagged at all. Since the images may be stored and tagged, the image determined to be most suitable for the collaborative image can be selected after the image has been taken based on a voting scheme between shutter presses. It is also possible for a single image to be tagged as both a user image and as part of a collaborative image. Tagged images can be retained to device memory or uploaded to a remote data store when there is sufficient network connectivity, whereas untagged images may be deleted to make room for subsequent sequences of full-frame video images.

In some embodiments, the collaborative system may obtain data from user devices regarding lighting conditions 508. For example, some of the user devices may include light-detecting components that can provide the system with the lighting conditions at a collaborative image capturing event. In another embodiment, the system may receive image data from multiple devices and determine from the sampling of the image data whether there is sufficient lighting. When it is determined that there is not adequate lighting for image capture, the collaborative system may coordinate camera flashing at substantially the same time as image capture. The system may ascertain the flashing or lighting capabilities of each device that has opted into an image capture moment 510. To the extent a user device includes a flash LED or other light emitting component, the system may configure the user device to flash or emit light at the coordinated time of image capture 512. The system may repeat steps 510 and 512 until each device has been configured to flash or emit light at the coordinated time 514.

At the coordinated time, each user device that has opted into the image capture moment may capture an image 516 such that multiple images are captured at substantially the same time. A timestamp associated with the image capture moment may be stored as metadata for the image. In some embodiments, the captured image may be immediately uploaded automatically to a centralized data store to enable viewing of the data in substantially real time. In other embodiments, the captured images may be uploaded at a later time. In such instances, the collaborative system can provide reminders to users to upload their captured images. When a sufficient number of images have been uploaded to the centralized data store, the multiple images can be aggregated into composited image data 518. In one embodiment, image stitching can be used by the collaborative system to generate panoramas from the multiple images. In other embodiments, multiple images may be rendered as a composited 3-D transformation of the aggregated image data. In yet another embodiment, the images from multiple users can be combined to create composited stereoscopic 3-D image data. The collaborative image capturing system may include a user interface with suitable viewer applications to display the composited image.

Figure 6:
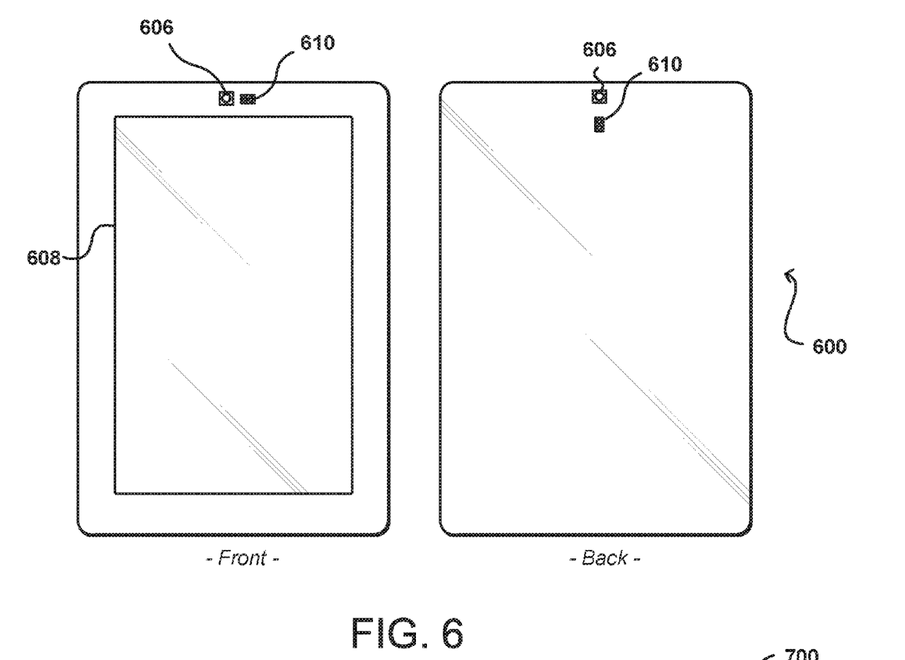
FIG. 6 illustrates an example of a computing device that can be used in accordance with various embodiments.
Figure 7:
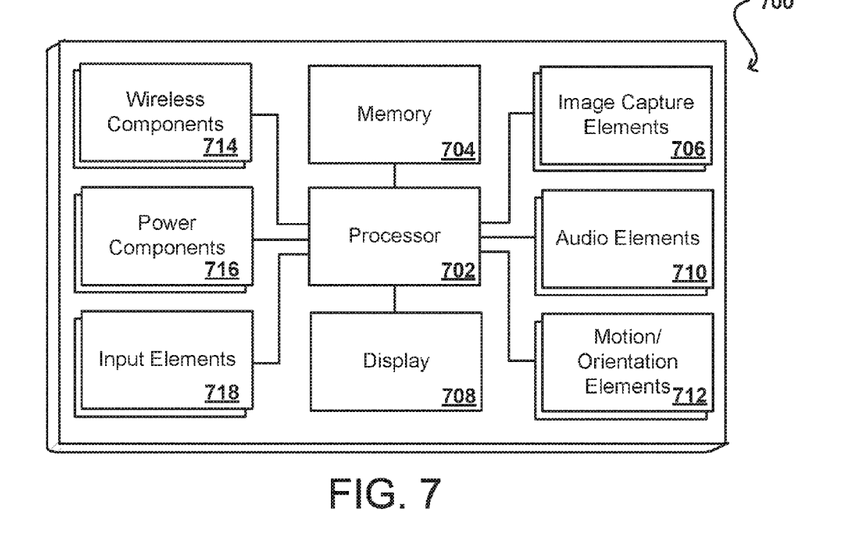
FIG. 7 illustrates an example configuration of components of a computing device such as that illustrated in FIG. 6.

FIG. 6 illustrates an example computing device 600 that can be used to perform approaches described in accordance with various embodiments. In this example, the device has a conventional image capturing component 606 on each of a same and opposite side of the device as a display element 608, and enabling the device to capture images in accordance with various embodiments. The computing device also includes a light emitting component 610 to providing lighting during image capturing according to certain embodiments. In order to provide various functionality described herein, FIG. 7 illustrates an example set of basic components of a computing device 700, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 708, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. As discussed above, the device in many embodiments will include one or more image capture elements 706, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. A video capture element can include, or be based at least in part upon any appropriate technology, such as a CCD or CMOS image capture element having a sufficient resolution, focal range, viewable area, to capture an image of the user when the user is operating the device.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one or more motion and/or orientation elements 712 that provide information such as a position, direction, motion, or orientation of the device. These one or more motion and/or orientation determining elements 712 can include, for example, accelerometers, inertial sensors, electronic gyroscopes, electronic compasses, and GPS elements.

The example device can also include one or more additional input devices 718 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The example device also includes one or more wireless components 714 operable to communicate with one or more computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
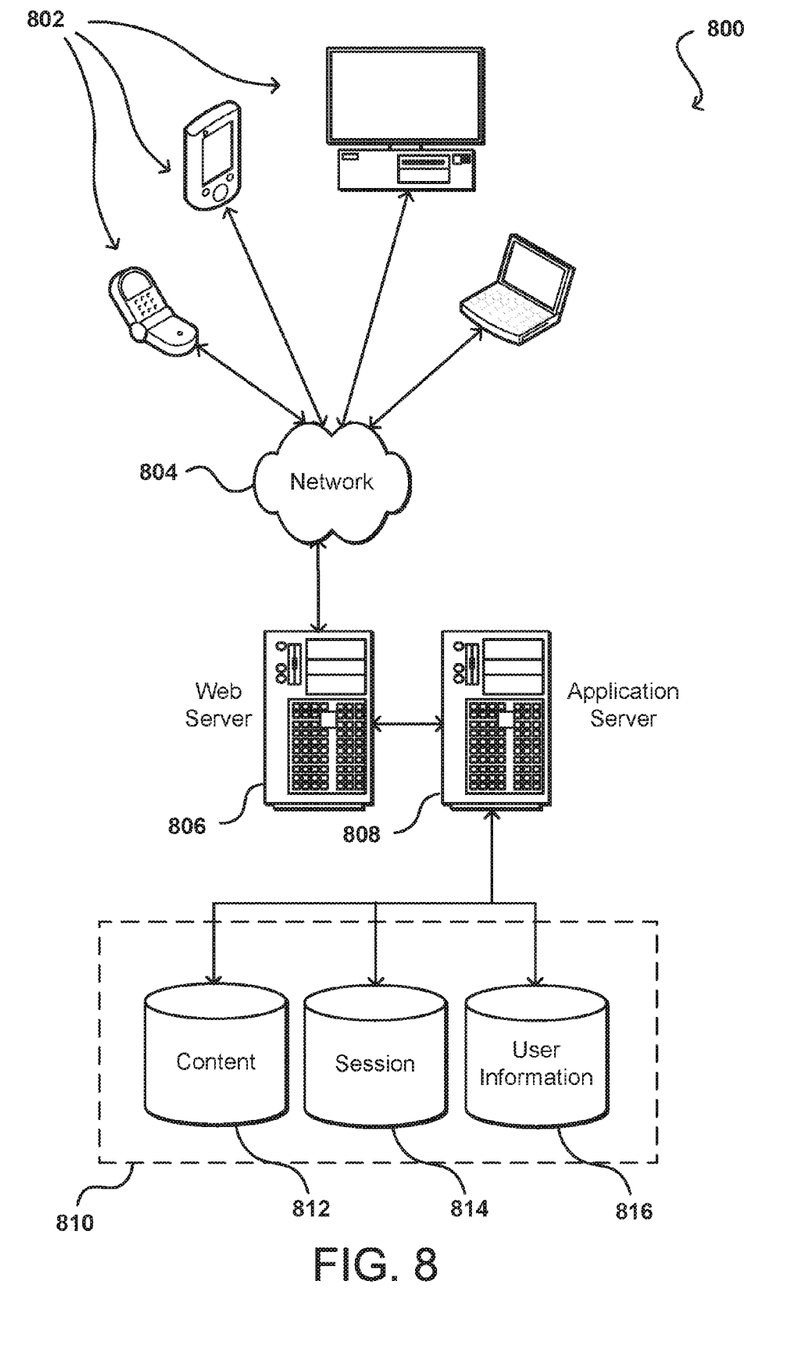
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:

determining, by a first computing system, a time period for a first camera to capture a first image representing a scene and a second camera to capture a second image representing at least a first portion of the scene, the first camera and the second camera being remote to the first computing system;

determining, by the first computing system, an aggregate amount of lumens to be emitted by one or more light emitting components corresponding to one or more cameras for capturing image data including at least a portion of the scene at a specified exposure within the time period;

determining, by the first computing system, a first amount of lumens to be emitted by a first light emitting component corresponding to the first camera for generating a first portion of the aggregate amount of lumens within the time period;

determining, by the first computing system, a second amount of lumens to be emitted by a second light emitting component corresponding to the second camera for generating a second portion of the aggregate amount of lumens within the time period;

sending, by the first computing system, first information for causing the first light emitting component to emit the first amount of lumens within the time period;

sending, by the first computing system, second information for causing the second light emitting component to emit the second amount of lumens within the time period;

receiving the first image, captured by the first camera within the time period, by the first computing system;

receiving the second image, captured by the second camera within the time period, by the first computing system;

generating, by the first computing system, composited image data using the first image and the second image, the composited image data representing at least one of a panorama, a three-dimensional transformation, or a stereoscopic image representing at least a second portion of the scene; and providing, by the first computing system to a second computing system that is remote to the first computing system, access to the composited image data.

2. The computer-implemented method of claim 1, further comprising:

sending, by the first computing system, first data causing the first camera to capture the first image within the time period; and sending, by the first computing system, second data causing the second camera to capture the second image within the time period.

3. The computer-implemented method of claim 2, wherein the first data comprises at least one of a formatted time of day, a delay period, a shutter release signal, or a generator locking signal.

4. The computer-implemented method of claim 1, further comprising:

receiving, by the first computing system, data corresponding to input to a shutter button of the first camera; and causing a shutter release of the first camera to be delayed until at least the time period.

5. The computer-implemented method of claim 1, further comprising:

receiving, by the first computing system, at least one of user data, geolocation data, position data, orientation data, time data, camera parameters, image parameters, or a description associated with at least one of the first camera or the first image.

6. The computer-implemented method of claim 1, wherein the first computing system operates with zero shutter lag (ZSL) to capture the first image.

7. The computer-implemented method of claim 1, wherein the first camera is incorporated within the first computing system.

8. The computer-implemented method of claim 1, wherein the first camera and the second camera are incorporated within a same computing device.

9. The computer-implemented method of claim 1, wherein the first camera is incorporated within a first computing device and the second camera is incorporated within a second computing device.

10. The computer-implemented method of claim 1, wherein the aggregate amount of lumens is a non-zero value and at least one of the first amount of lumens or the second amount of lumens is zero.

11. A computing system, comprising:

one or more processors;

memory including instructions that, upon being executed by the one or more processors, cause the computing system to:

determine a time period for a first camera to capture a first image representing a scene and a second camera to capture a second image representing at least a first portion of the scene, the first camera and the second camera being remote to the computing system;

determine an aggregate amount of lumens to be emitted by one or more light emitting components corresponding to one or more cameras for capturing image data of at least a portion of the scene at a specified exposure within the time period;

determine a first amount of lumens to be emitted by a first light emitting component corresponding to the first camera for generating a first portion of the aggregate amount of lumens within the time period;

determine a second amount of lumens to be emitted by a second light emitting component corresponding to the second camera for generating a second portion of the aggregate amount of lumens within the time period;

send first information for causing the first light emitting component to emit the first amount of lumens within the time period;

send second information for causing the second light emitting component to emit the second amount of lumens within the time period;

receive the first image captured by the first camera within the time period;

receive the second image captured by the second camera within the time period;

generate composited image data using the first image and the second image, the composited image data representing at least one of a panorama, a three-dimensional transformation, or a stereoscopic image representing at least a second portion of the scene; and provide access to the composited image data to a second computing system that is remote to the computing system.

12. The computing system of claim 11, wherein the instructions upon being executed further cause the computing system to:

receive data corresponding to input to a shutter button of the first camera; and cause a shutter release of the first camera to be delayed until at least the time period.

13. The computing system of claim 11, wherein the first camera is operated using zero shutter lag within the time period.

14. The computing system of claim 13, wherein the instructions upon being executed further cause the computing system to:

generate a generator lock signal;

send the generator lock signal to a first computing device incorporating the first camera; and send the generator lock signal to a second computing device.

15. The computing system of claim 11, wherein the first amount of lumens is the aggregate amount of lumens and the second amount of lumens is zero.

16. A computer-implemented method, comprising:

determining, by a first computing system, a time for a first camera to capture a first image representing a scene and a second camera to capture a second image representing at least a first portion of the scene, the first camera and the second camera being remote to the first computing system;

determining, by the first computing system, an aggregate amount of lumens to be emitted by one or more light emitting components corresponding to one or more cameras for capturing image data of at least a portion of the scene at a specified exposure at the time;

determining, by the first computing system, a first amount of lumens to be emitted by a first light emitting component corresponding to the first camera for generating a first portion of the aggregate amount of lumens at the time;

determining, by the first computing system, a second amount of lumens to be emitted by a second light emitting component corresponding to the second camera for generating a second portion of the aggregate amount of lumens at the time;

sending, by the first computing system, first data for causing the first light emitting component to emit the first amount of lumens at the time;

sending, by the first computing system, second data for causing the second light emitting component to emit the second amount of lumens at the time;

sending, by the first computing system, third data causing the first camera to capture the first image at the time;

sending, by the first computing system, fourth second data causing the second camera to capture the second image at the time;

receiving the first image, captured by the first camera at the time, by the first computing system;

receiving the second image, captured by the second camera at the time, by the first computing system;

generating, by the first computing system, composited image data using the first image and the second image, the composited image data representing at least one of a panorama, a three-dimensional transformation, or a stereoscopic image representing at least a second portion of the scene; and sending, by the first computing system, the composited image data to a second computing system that is remote to the first computing system.

17. The computer-implemented method of claim 16, wherein the third data comprises at least one of a formatted time of day, a delay period, a shutter release signal, or a generator locking signal.

18. The computer-implemented method of claim 16, wherein the aggregate amount of lumens is a first non-zero value, the first amount of lumens is a second non-zero value, and the second amount of lumens is a third non-zero value.

19. The computer-implemented method of claim 16, wherein the first camera and the second camera are incorporated within a same computing device.

20. The computer-implemented method of claim 16, wherein the first camera is incorporated within a first computing device and the second camera is incorporated within a second computing device.

* * * * *